May 8, 1962 R. ZIGGEL 3,033,034
RESISTANCE STRAIN GAUGE OPERATING WITH TRANSFORMATION
Filed March 30, 1959

INVENTOR
*ROBERT ZIGGEL*

BY
*Frank R. Linfani*
AGENT

United States Patent Office 3,033,034
Patented May 8, 1962

3,033,034
RESISTANCE STRAIN GAUGE OPERATING WITH TRANSFORMATION
Robert Ziggel, Hamburg-Wandsbek, Germany, assignor to North American Philips Company, Inc., New York, N.Y., a corporation of Delaware
Filed Mar. 30, 1959, Ser. No. 802,752
Claims priority, application Germany May 3, 1958
3 Claims. (Cl. 73—141)

In machines in which considerable stress occurs, for example press rollers, strain gauges are used for converting the mechanical values to be measured into electrical values. In such cases a transformation member is frequently required for obtaining in a simple manner comparatively high electrical values from the mechanical values.

Resistance strain gauges are known, but these have the disadvantage that they can only be mounted directly on the object to be measured, each strain gauge having to be matched individually to the object to be measured, and that for inspection the whole arrangement has to be disassembled.

The present invention relates to resistance strain gauges in which this disadvantage does not occur, but which affords the advantage that they can be accurately adjusted beforehand and arranged on the object to be measured within a short time. According to the invention, such a resistance strain gauge comprises a conductive body which, matched in shape, is connected at two areas to the object to be measured, the conductive body between these areas having a recess on the wall of which the strain gauges are arranged symmetrically with respect to its centre.

Figure 1:
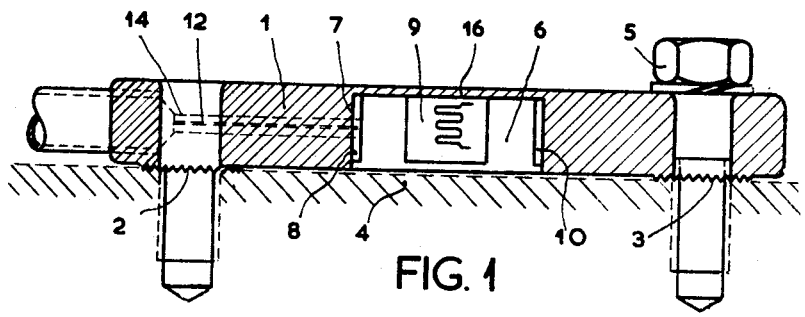
Figure 2:
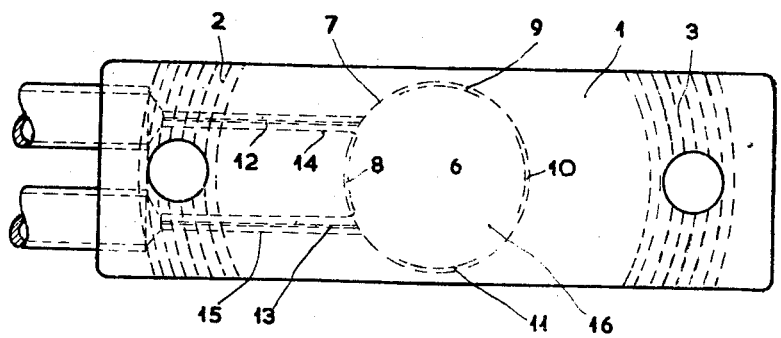

In order that the invention may be readily carried into effect, one embodiment will now be described in detail, by way of example, with reference to the accompanying drawing, in which FIG. 1 shows a cross-section and FIG. 2 is a plan view thereof.

The conductive body of a shape matching that of the object is indicated by 1. Body 1 is connected to surfaces 2 and 3 of the object to be measured, for example the frame of a roller 4. The surfaces 2 and 3 are preferably toothed or knurled and the body 1 is likewise toothed or knurled and joined by means of screws 5 to the frame 4. Between the areas of attachments the body 1 has a recess 6, which may be of oval or circular shape. Strain gauges 8 to 11 are arranged on the wall 7 of recess 6, whilst supply leads 12 and 13 are located in bores 14, 15 of the body 1. The diameter of recess 6 and the thickness of base 16 determine the desired ratio of transmission.

For bringing about transformation, it is necessary to impose the following condition which is almost invariably fulfilled, for example, for frames of rollers.

The product cross-section and elasticity module of the stand of the roller must be great with respect to the same product of a conductive body, that is to say, only a very small proportion of the deformation work must be stored in the body, or, in other words, the body must not increase the resistance of the stand against deformation. When this condition is fulfilled, the body acquires a lengthening or shortening which is determined by the dimensions and the load on the stand. If the body has a constant cross-section, an increase in stress does not occur and the expansion of the body is equal to that of the stand. If the body has a cross-section which is not constant, an increase in stress and hence also an increase in expansion occurs at the area of the smallest cross-section. When the strain gauges are arranged at this area, a voltage is available at the measuring device concerned, which voltage is increased by the factor:

$$O = \frac{\epsilon \text{ body}}{\epsilon \text{ stand}}$$

wherein $\epsilon$ indicates the expansion. The ratio of transmission otherwise also depends upon the length of the conductive body and the diameter of the recess.

It has been found in practice that it is of little use choosing an extremely high ratio of transmission, since a very thin thickness of the wall is then involved. In addition, the requirements to be imposed upon the structure increase with decreasing thickness of the wall. When the length of the body is increased, it must be considered that doubling of the length does not provide doubling of the transmission ratio. In order to obtain a more accurate attachment of the resistance strain gauges 8 to 11 to the wall 7 of the recess, it is preferable to provide the attachment area with a somewhat greater radius of curvature, so that the recess acquires a shape slightly differing from that of a circle. The strain gauges themselves may either constitute a measuring bridge, or form part of a measuring bridge, the outputs of which are connected in known manner to a measuring or indicating instrument.

The recess 6 is preferably provided symmetrically between the attachment areas of the body 1, the strain gauges 8 to 11 being arranged as closely as possible to the areas of the largest and the smallest wall-thickness of the recess in the body. The recess provided in the body, which is preferably quadrangular in shape, is filled up with an elastic medium for protection against outer influences, for example moisture, and is preferably provided on the side adjacent the object to be measured, so that the strain gauges are also protected against outer mechanical influences by the base 16.

In order to avoid any loads on the strain gauges which might occur in mounting the body as a result of mechanical preliminary stress, the strain gauges, that is to say, their active surfaces constituted by the resistance windings, are preferably arranged in the recess 6 so that the neutral fibre of the conductive body extends through the surface centres of gravity of the active strain gauges. It is thus ensured that preliminary stress is already compensated inside a single strain gauge.

What is claimed is:

1. A device for determining strain in a member comprising a bar-shaped transformation body having at one side interspaced surface portions adapted to be placed in contact with a surface of said member, means to secure said body to said member at said surface portions, said body being provided at a point intermediate said surface portions with a cavity extending inwardly from one side of the body and forming at the end of the cavity a portion of reduced cross section, and a plurality of strain gauges arranged symetrically on the side surface of said cavity.

2. A device for determining strain in a member comprising a bar-shaped transformation body having at one side interspaced surface portions adapted to be placed in contact with a surface of said member, means to secure said body to said member at said surface portions, said body being provided at a point intermediate said surface portions with a protective cavity extending inwardly from said side of the body and forming at the end of the cavity a portion of reduced cross section, a plurality of strain gauges arranged symetrically on the side surface of said cavity, and elastic material filling the spaces in the cavity.

3. A strain gauge comprising a bar shaped strain conduction body having contact surfaces at one side of said body, means associated with said surfaces to connect said body to a member to be gauged, a cavity between said surfaces extending inwardly from said one side and defining a relatively thin wall portion in the side of said body opposed to said one side and the sides of said body transverse thereto, a plurality of strain gauges mounted on the cavity side walls at least at the area of minimum cross section; the force transmission ratio of said body being determined by the ratio of cavity diameter and the thickness of said thin wall portion.

References Cited in the file of this patent

UNITED STATES PATENTS

| | | |
|---|---|---|
| 2,561,318 | Ruge | July 17, 1951 |
| 2,645,120 | Scott | July 14, 1953 |
| 2,722,587 | Buzzetti et al. | Nov. 1, 1955 |